(12) United States Patent
Lee

(10) Patent No.: US 7,679,553 B1
(45) Date of Patent: Mar. 16, 2010

(54) ADJUSTING GPS COMMUNICATION WITH A WIRELESS DEVICE

(75) Inventor: Chunkwok Lee, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/184,603

(22) Filed: Aug. 1, 2008

(51) Int. Cl.
   *G01S 1/02* (2006.01)
(52) U.S. Cl. .............................. 342/357.02; 342/357.12
(58) Field of Classification Search ............ 342/357.02, 342/357.06, 357.12, 357.15; 701/213, 215
   See application file for complete search history.

(56) References Cited

U.S. PATENT DOCUMENTS

2005/0275587 A1* 12/2005 Siegel et al. ........... 342/357.06

2009/0196122 A1* 8/2009 Crowell ..................... 367/127

\* cited by examiner

*Primary Examiner*—Dao L Phan

(57) ABSTRACT

Adjusting the GPS fix frequency of a wireless device is described. For example, a computer-implemented method according to one embodiment comprises: attempting GPS fix operations on a wireless device according to a first schedule; detecting one or more unsuccessful GPS fix operations; determining whether a location identified by a previous successful GPS fix operation is at or within a specified range from a first specified location; if the location identified by the previous successful GPS fix operation is at or within a specified range from a first specified location, then adjusting the wireless device to perform GPS fix operations according to a second schedule; and if the location identified by the previous successful GPS fix operation is not at or within a specified range from a first specified location, then adjusting the wireless device to perform GPS fix operations according to a third schedule.

24 Claims, 4 Drawing Sheets

ADJUSTING GPS COMMUNICATION WITH A WIRELESS DEVICE

TECHNICAL FIELD

This application relates generally to the field of wireless data processing systems. More particularly, this application relates to a adjusting GPS communication with a wireless device.

BACKGROUND

The use of wireless devices has become an increasing part of everyday life. Wireless devices have become popular due to their portability, convenience and ease of use. Today, wireless devices offer a myriad of functions including telephony functions, location-based services, email, multimedia playback, and electronic calendaring, to name a few. Integrated circuit technology has allowed for the miniaturization of circuits into smaller and smaller form factors; allowing for additional functionality and services to become available on wireless devices. Additionally, decreasing memory sizes have permitted wireless devices to store larger amounts of information. As a result, wireless networks are rapidly expanding bandwidth and services to accommodate this increase in wireless information and functionality.

Many wireless devices today include Global Positioning System (GPS) capabilities. A GPS receiver within a GPS-enabled wireless device can determine the device's precise location, speed, and direction by reading precise microwave signals transmitted from a constellation of Medium Earth Orbit satellites. The GPS receiver performs periodic "GPS fix" operations using the satellite signals to calculate its location. This information may be used for a variety of applications including, for example, mapping programs.

One problem which exists is that each GPS fix consumes a significant amount of time and battery life. As such, it would be useful to intelligently reduce the frequency with which GPS fixes are attempted by the wireless device in certain circumstances.

SUMMARY

Adjusting the GPS fix frequency of a wireless device is described. For example, a computer-implemented method according to one embodiment comprises: attempting GPS fix operations on a wireless device according to a first schedule; detecting one or more unsuccessful GPS fix operations; determining whether a location identified by a previous successful GPS fix operation is at or within a specified range from a first specified location; if the location identified by the previous successful GPS fix operation is at or within a specified range from a first specified location, then adjusting the wireless device to perform GPS fix operations according to a second schedule; and if the location identified by the previous successful GPS fix operation is not at or within a specified range from a first specified location, then adjusting the wireless device to perform GPS fix operations according to a third schedule.

BRIEF DESCRIPTION OF THE DRAWINGS

A better understanding of adjusting GPS communication with a wireless device can be obtained from the following detailed description in conjunction with the following drawings, in which.

DETAILED DESCRIPTION

Throughout the description, for the purposes of explanation, numerous specific details are set forth in order to provide a thorough understanding of adjusting GPS communication with a wireless device. It will be apparent, however, to one skilled in the art that adjusting GPS communication with a wireless device may be practiced without some of these specific details. In other instances, well-known structures and devices are shown in block diagram form to avoid obscuring the underlying principles of adjusting GPS communication with a wireless device.

Embodiments of a Data Processing Service

Figure 1:
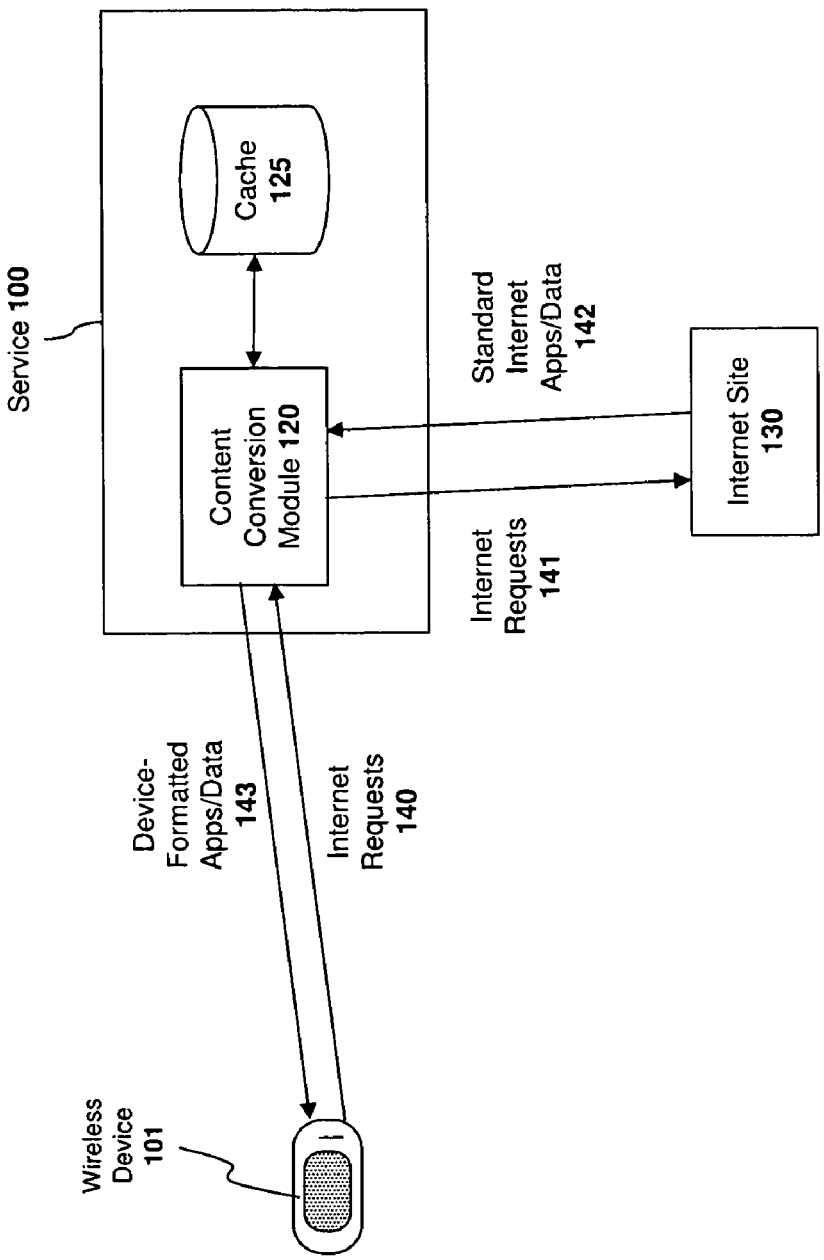
FIG. 1 illustrates a system that includes a service communicating with a data processing device.

Embodiments of the invention may be implemented on a wireless device 101 which communicates with a data processing service 100 as illustrated generally in FIG. 1. Embodiments of a service 100 and data processing device 101 are described, for example, in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 will now be described followed by a detailed description of a system and method for adjusting GPS communication with a wireless device. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 101 can properly interpret. Thus, as illustrated in FIG. 1, one embodiment of the service 100 includes content conversion logic 120 for processing requests for Internet content 140. More particularly, the service 100 acts as a proxy for the data processing device 101, forwarding Internet requests 140, 141 to the appropriate Internet site 130 on behalf of the data processing device 101, receiving responses from the Internet site 130 in a standard Internet format (e.g., Web pages with embedded audio/video and graphical content, e-mail messages with attachments, . . . etc), and converting the standard Internet responses 124 into a format which the data processing device 101 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 101. As described above, in one embodiment, the bytecodes may be Java bytecodes/applets. However, the conversion logic 120 may generate various other types of interpreted and/or non-interpreted code, depending on the particular type of data processing device 101 being used (e.g., one with an interpreter module or one without).

Because one embodiment of the service 100 maintains an intimate knowledge of the capabilities/configuraten of each data processing device 101 (e.g., screen size, graphics/audio capabilities, available memory, processing power, user preferences, . . . etc) it can reconstruct the requested Internet content accurately, while at the same time minimizing the bandwidth required to transmit the content to the device 101. For example, the conversion logic 120 may perform pre-scaling and color depth adjustments to the requested content so that it will be rendered properly within the data processing device's 101's display. In making these calculations, the conversion may factor in the memory and processing power available on the data processing device 101. In addition, the conversion logic 120 may compress the requested content using a variety of compression techniques, and thereby preserve network bandwidth.

Figure 2:
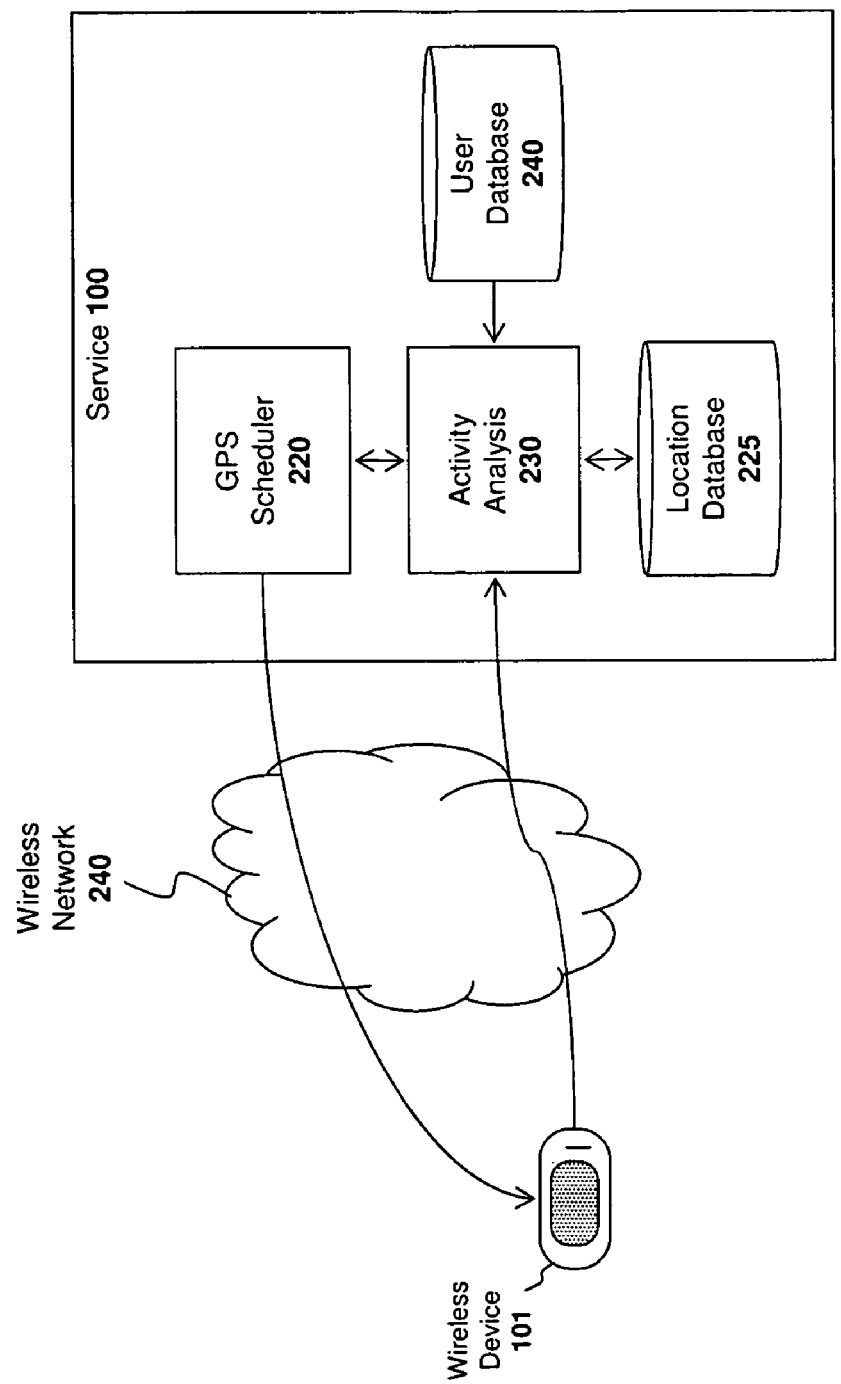
FIG. 2 illustrates a system architecture according to one embodiment of adjusting GPS communication with a wireless device.
Figure 3:
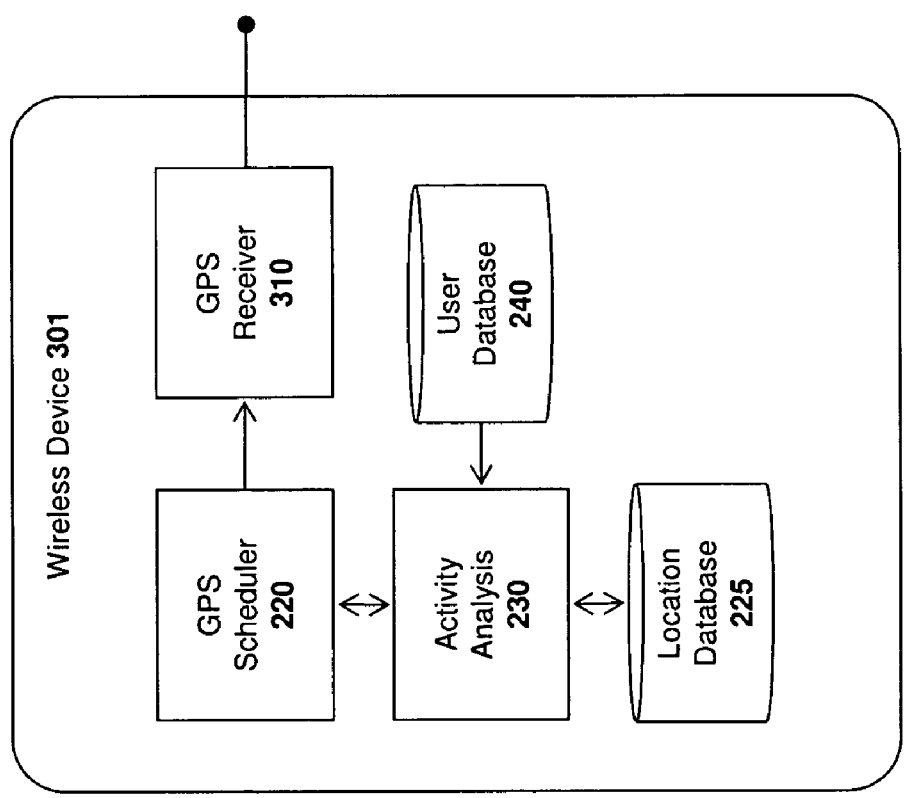
FIG. 3 illustrates a wireless device architecture according to one embodiment of adjusting GPS communication with a wireless device.

FIG. 2 illustrates one embodiment of a service-based system for scheduling and dynamically adjusting GPS fix timing on a wireless device 101. FIG. 3 illustrates a stand-alone wireless device 301 utilizing the same (or similar) functionality as the service-based system of FIG. 2. While much of the following discussion will focus on the system shown in FIG. 2, the same basic functionality is also implemented within the stand-alone wireless device 301 shown in FIG. 3.

As illustrated in FIG. 2, one embodiment of the invention includes an activity analysis module 230 for analyzing current user/wireless device activity and responsively updating a GPS scheduler module 220. The GPS scheduler module 220 then adjusts the timing of GPS fixes performed on the wireless device 101. This embodiment of the invention also includes a location database 225 for storing known locations such as shopping malls, restaurants, gas stations and other points of interest. The location database 225 associates each of these known locations with GPS data provided by the wireless device 101 (e.g., to notify the user of nearby points of interest and/or display the points of interest on a map). In addition, this embodiment includes a user database 240 for storing user-specific locations such as a user's home and work locations and/or other places frequented by the user. The user database 240 may also include the user's calendar, contacts list, email, and any other types of user data maintained by the service 100.

In one embodiment, the wireless device 101 initially performs GPS fix attempts according to a predetermined schedule (e.g., every minute) and reports the results of the GPS fix attempts to the activity analysis module 230. When performing a GPS fix attempt, the wireless device 101 powers on its GPS receiver and listens for GPS signals transmitted from multiple satellites. If it receives the signals, it performs a calculation to determine its current location. In one embodiment, when GPS fix attempts are unsuccessful (e.g., when the user moves indoors and the GPS receiver cannot receive the satellite signals), the wireless device 101 reports the unsuccessful attempts to the activity analysis module 230. When the GPS fix attempts are successful, the wireless device 101 reports its current position to the activity analysis module 230. Using this information, as well as the information stored in the location database 225 and the user database 240, the activity analysis module 230 determines the schedule for subsequent GPS fix attempts.

In one embodiment, the activity analysis module 230 reduces the frequency of subsequent GPS fix attempts each time it detects a new unsuccessful attempt. For example, upon detecting N unsuccessful attempts (where N is greater than or equal to 1), the activity analysis module 230 increases the time until the next fix attempt by a specified amount (e.g., by 50%). If the next one or more additional GPS fix attempts are unsuccessful, then the activity analysis module 230 may again increase the amount of time until the next fix attempt (e.g., by another 100%). In one embodiment, the activity analysis module 230 continues to increase the time period between successive GPS fix attempts until a specified threshold value has been reached. When a successful GPS fix is detected, the activity analysis module 230 may return to the original predetermined schedule (until new unsuccessful attempts are detected). Using the foregoing techniques significantly reduces the power consumed by GPS operations when a user moves indoors because the frequency of GPS fix attempts will decrease as new unsuccessful attempts are detected.

In addition to the foregoing, one embodiment of the activity analysis module 230 uses information from the location database 225 and/or the user database 240 to determine a GPS fix schedule. Specifically, in one embodiment, the activity analysis module 230 uses the last known location of the wireless device 101 (e.g., as provided by the last successful GPS fix) to determine if any particular points of interest are nearby. For example, if the last known location of the wireless device was at (or within a specified distance from) the user's home, then the activity analysis module 230 may conclude that the user is currently at home and adjust the GPS fix schedule accordingly (e.g., increasing the time between successive GPS fix attempts). The activity analysis module 230 may also factor in the current time of day and/or scheduling data within the user's calendar to adjust the GPS fix schedule. For example, if the day is a weekday, the time is after 6:00 PM, and the last known location of the wireless device 101 is near the user's home, then the activity analysis module may employ a more aggressive power saving mode (e.g., significantly reducing the frequency of GPS fix attempts under the assumption that the user is at home for the evening).

In this manner, the activity analysis module 230 may establish GPS fix "profiles" for each user such as a "home" profile and a "work" profile. Each profile specifies a GPS fix schedule to be implemented by the GPS scheduler 220. A particular profile is selected by the activity analysis module based on the last known location of the wireless device 101 and/or other variables (e.g., time of day, day of week, user calendar entries, etc). These profiles may be used in conjunction with a "default" profile which will be implemented if, for example, the last known location of the user is not near a known point of interest (e.g., the user's home or work). One example of a default profile is described above (i.e., in which the time between GPS fix attempts is reduced in response to unsuccessful attempts).

In one embodiment, the probability of attaining a GPS fix at or around various points of interest are stored within the location database 225 or user database 240. If the user is at or near a point-of-interest in the location database 225 or user database 240 for which there is a low probability of attaining a successful GPS fix (e.g., an indoor shopping mall), then the activity analysis module 230 may decrease the frequency of attempting to attain the fix. Conversely, if there is a high probability of attaining a GPS fix around that point of interest (e.g., an outdoor shopping mall), then the activity analysis module 230 may adjust the GPS scheduler 220 to attain a fix more frequently.

Figure 4:
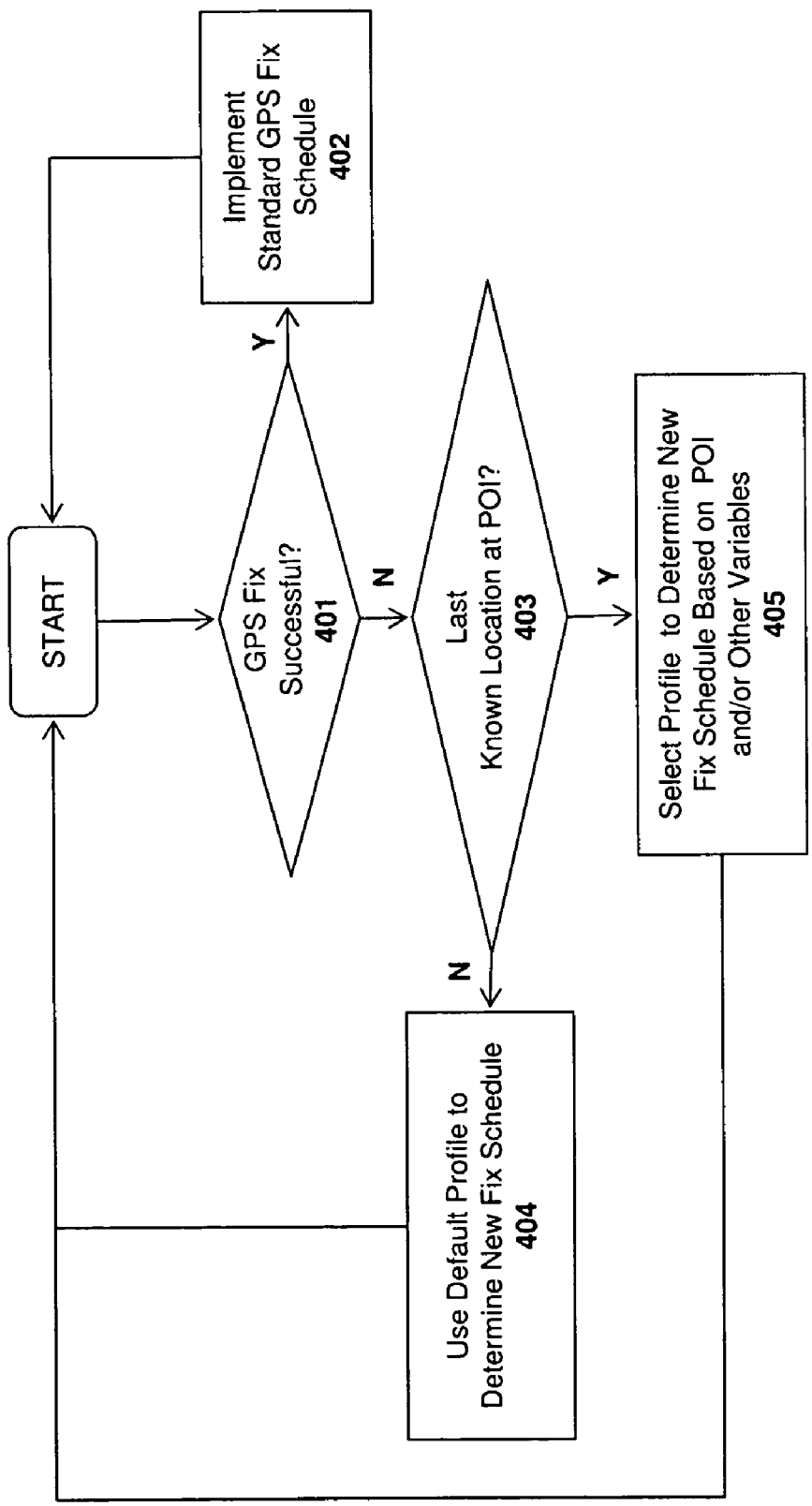
FIG. 4 illustrates a method according to one embodiment of adjusting GPS communication with a wireless device.

FIG. 4 illustrates one embodiment of a method which incorporates the foregoing techniques. A determination is made at step 401 as to whether the current GPS fix was successful. If so, then at step 402, the standard GPS fix schedule is maintained. By way of example, the standard schedule may specify a GPS fix every N minutes. If the GPS fix attempt was unsuccessful, then at 403, a determination is made as to whether the user's last known location was near (i.e., within a specified distance from) a known point of interest, such as the user's home or work. If not, then a "default" profile is used at step 404 to adjust the new GPS fix schedule. As mentioned above, the "default" schedule may involve increasing the time between successive GPS fix attempts. If the user's last known location was near a known point of interest, then at step 405, a particular profile is selected to determine the next GPS fix schedule based on the detected point of interest and/or other variables. As mentioned above, the other variables may include the current date, time of day, and day of the week. In addition, in one embodiment, meetings scheduled within the user's calendar may be factored in to determine a particular GPS fix schedule. For example, an "in meeting" profile may be used during periods of time when the user is scheduled to be in meetings. Because the user typically has no need for GPS information while in a meeting, the "in meeting" profile may simply turn the GPS receiver off during the meeting time.

As mentioned above, FIG. 3 illustrates one particular embodiment of the invention implemented on a stand-alone wireless device 301. In this embodiment, the wireless device 301 includes a local activity analysis module 230 and GPS scheduler 220 to control the operation of a GPS receiver 310 using the techniques described above. In addition, the wireless device 301 includes a local copy of a location database 225 and user database 240 which store the same types of location data and user data, respectively, as described above.

The wireless device 101 illustrated in FIGS. 2 and 3 may include one or more transceivers (not shown) for communicating over wireless networks. Both the wireless device 101 and the service 100 may include one or more memories (not shown) for storing program code and data and one or more processors (not shown) for processing the program code and data to perform the operations described herein. Thus, in one embodiment, the activity analysis module 230 and GPS scheduler module 220 are implemented as program code executed by a general purpose or special purpose processor. Alternatively, these modules may be implemented as hardware or may be implemented as any suitable combination of hardware and software while still complying with the underlying principles of the invention.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while embodiments described above focus on GPS technology, the underlying principles of the invention may be implemented using a variety of location protocols including, for example, Assisted GPS.

Accordingly, the scope and spirit of the invention should be judged in terms of the claims which follow.

What is claimed is:

1. A computer-implemented method comprising:
   attempting GPS fix operations on a wireless device according to a first schedule;
   detecting one or more unsuccessful GPS fix operations;
   determining whether a location identified by a previous successful GPS fix operation is at or within a specified range from a specified location;
   if the location identified by the previous successful GPS fix operation is at or within the specified range from the specified location, then adjusting the wireless device to perform the GPS fix operations according to a second schedule; and
   if the location identified by the previous successful GPS fix operation is not at or within the specified range from the specified location, then adjusting the wireless device to perform the GPS fix operations according to a third schedule.

2. The method as in claim 1 wherein both the second schedule and the third schedule comprises increasing a time period between successive GPS fix operations relative to the first schedule.

3. The method as in claim 2 further comprising:
   decreasing the time period between the successive GPS fix operations upon detecting a successful GPS fix operation.

4. The method as in claim 1 further comprising:
   evaluating a time of day, day of week, date, or user calendar entries when determining the second schedule.

5. The method as in claim 1 wherein the third schedule comprises:
   increasing a time period between the GPS fix operations after detecting N unsuccessful attempts, where N is greater than or equal to 1; and
   increasing the time period between the GPS fix operations again after detecting M additional unsuccessful attempts, where M is greater than or equal to 1.

6. The method as in claim 1 wherein the specified location is a location of a user's home.

7. The method as in claim 1 wherein the specified location is a location of a user's business.

8. A system comprising at least one memory for storing program code and at least one processor for processing the program code to perform the operations of:

attempting GPS fix operations on a wireless device according to a first schedule;

detecting one or more unsuccessful GPS fix operations;

determining whether a location identified by a previous successful GPS fix operation is at or within a specified range from a first specified location;

if the location identified by the previous successful GPS fix operation is at or within the specified range from the specified location, then adjusting the wireless device to perform the GPS fix operations according to a second schedule; and if the location identified by the previous successful GPS fix operation is not at or within the specified range from the specified location, then adjusting the wireless device to perform the GPS fix operations according to a third schedule.

9. The system as in claim 8 wherein both the second schedule and the third schedule comprises increasing a time period between successive GPS fix operations relative to the first schedule.

10. The system as in claim 9 comprising additional program code to cause the processor to perform the operations of:

decreasing the time period between the successive GPS fix operations upon detecting a successful GPS fix operation.

11. The system as in claim 8 comprising additional program code to cause the processor to perform the operations of:

evaluating a time of day, day of week, date, or user calendar entries when determining the second schedule.

12. The system as in claim 8 wherein the third schedule comprises:

increasing a time period between the GPS fix operations after detecting N unsuccessful attempts, where N is greater than or equal to 1; and increasing the time period between the GPS fix operations again after detecting M additional unsuccessful attempts, where M is greater than or equal to 1.

13. The system as in claim 8 wherein the specified location is a location of a user's home.

14. The system as in claim 8 wherein the specified location is a location of a user's business.

15. A machine-readable medium having program code stored thereon which, when executed by a machine, causes the machine to perform the operations of:

attempting GPS fix operations on a wireless device according to a first schedule;

detecting one or more unsuccessful GPS fix operations;

determining whether a location identified by a previous successful GPS fix operation is at or within a specified range from a specified location;

if the location identified by the previous successful GPS fix operation is at or within the specified range from the specified location, then adjusting the wireless device to perform the GPS fix operations according to a second schedule; and if the location identified by the previous successful GPS fix operation is not at or within the specified range from the specified location, then adjusting the wireless device to perform the GPS fix operations according to a third schedule.

16. The machine-readable medium as in claim 15 wherein both the second schedule and the third schedule comprises increasing a time period between successive GPS fix operations relative to the first schedule.

17. The machine-readable medium as in claim 16 comprising additional program code to cause the processor to perform the operations of:

decreasing the time period between the successive GPS fix operations upon detecting a successful GPS fix operation.

18. The machine-readable medium as in claim 15 comprising additional program code to cause the processor to perform the operations of:

evaluating a time of day, day of week, date, or user calendar entries when determining the second schedule.

19. The machine-readable medium as in claim 15 wherein the third schedule comprises:

increasing a time period between the GPS fix operations after detecting N unsuccessful attempts, where N is greater than or equal to 1; and increasing the time period between the GPS fix operations again after detecting M additional unsuccessful attempts, where M is greater than or equal to 1.

20. The machine-readable medium as in claim 15 wherein the specified location is a location of a user's home.

21. The machine-readable medium as in claim 15 wherein the specified location is a location of a user's business.

22. A computer-implemented method comprising:

attempting GPS fix operations on a wireless device according to a first schedule;

detecting one or more unsuccessful GPS fix operations;

determining whether a location identified by a previous successful GPS fix operation is at or within a specified range from a specified location;

if the location identified by the previous successful GPS fix operation is at or within the specified range from the specified location, then adjusting the wireless device to perform the GPS fix operations according to a second schedule.

23. The method as in claim 22 further comprising:

detecting N unsuccessful GPS fix operations; and responsively adjusting the wireless device to perform the GPS fix operations according to the second schedule, the second schedule comprising less frequent GPS fix operations relative to the first schedule.

24. A computer-implemented method comprising:

attempting GPS fix operations on a wireless device according to a first schedule;

determining whether a location identified by a previous successful GPS fix operation is at or within a specified range from a specified location, the specified location stored in a database and associated with a probability of achieving successful GPS fix operations;

if the location identified by the previous successful GPS fix operation is at or within the specified range from the specified location, then adjusting the wireless device to perform the GPS fix operations according to a second schedule based on the probability of achieving successful GPS fix operations associated with the specified location.

* * * * *

UNITED STATES PATENT AND TRADEMARK OFFICE
CERTIFICATE OF CORRECTION

PATENT NO. : 7,679,553 B1  
APPLICATION NO. : 12/184603  
DATED : March 16, 2010  
INVENTOR(S) : Chunkwok Lee Page 1 of 1

It is certified that error appears in the above-identified patent and that said Letters Patent is hereby corrected as shown below:

In column 1, line 8, after "relates to" delete "a".

In column 7, line 6, in Claim 8, after "from a" delete "first".

Signed and Sealed this
Tenth Day of May, 2011

David J. Kappos
*Director of the United States Patent and Trademark Office*